United States Patent [19]

Marino et al.

[11] Patent Number: 5,004,979
[45] Date of Patent: Apr. 2, 1991

[54] BATTERY TACH

[75] Inventors: Joseph A. Marino, Waukesha; Surender K. Makhija, Brookfield; Majid Taghikhani, Milwaukee; Peter A. Puetz, Waukesha, all of Wis.

[73] Assignee: Bear Automotive Service Equipment Company, New Berlin, Wis.

[21] Appl. No.: 496,103

[22] Filed: Mar. 16, 1990

Related U.S. Application Data

[63] Continuation of Ser. No. 116,634, Nov. 3, 1987, abandoned.

[51] Int. Cl.⁵ .................................... G01P 3/42
[52] U.S. Cl. ................................ 324/160; 361/239
[58] Field of Search ............... 324/160, 169, 170, 177; 361/239

[56] References Cited

U.S. PATENT DOCUMENTS

| | | | |
|---|---|---|---|
| 3,729,989 | 5/1973 | Little | 73/133 |
| 3,811,089 | 5/1974 | Strzelewicz | 324/170 |
| 3,818,343 | 6/1974 | Galli et al. | 324/177 |
| 3,886,450 | 5/1975 | Trussell et al. | 324/170 |
| 3,909,717 | 9/1975 | Gazzano | 324/166 |
| 3,934,200 | 1/1976 | Schoonover et al. | 324/163 |
| 4,138,728 | 2/1979 | Tung | 364/565 |
| 4,199,800 | 4/1980 | Weit | 361/239 |
| 4,251,774 | 2/1981 | Knödler | 324/169 |
| 4,449,100 | 5/1984 | Johnson et al. | 324/378 |

Primary Examiner—Kenneth Wieder
Assistant Examiner—Maura K. Regan
Attorney, Agent, or Firm—Kinney & Lange

[57] ABSTRACT

A signal representing the RPM of an internal combustion engine is produced by a signal processor connected to the battery of the vehicle. The signal processor derives an electrical signal from the battery which contains signal components produced by operation of the vehicle ignition system, as well as components from a multitude of other sources such as the voltage regulator, fans, air conditioning and other electrical systems of the vehicle. The signal processor filters and signal processes the signal derived from the vehicle battery to produce a signal having a frequency which is related to the RPM of the engine.

29 Claims, 1 Drawing Sheet

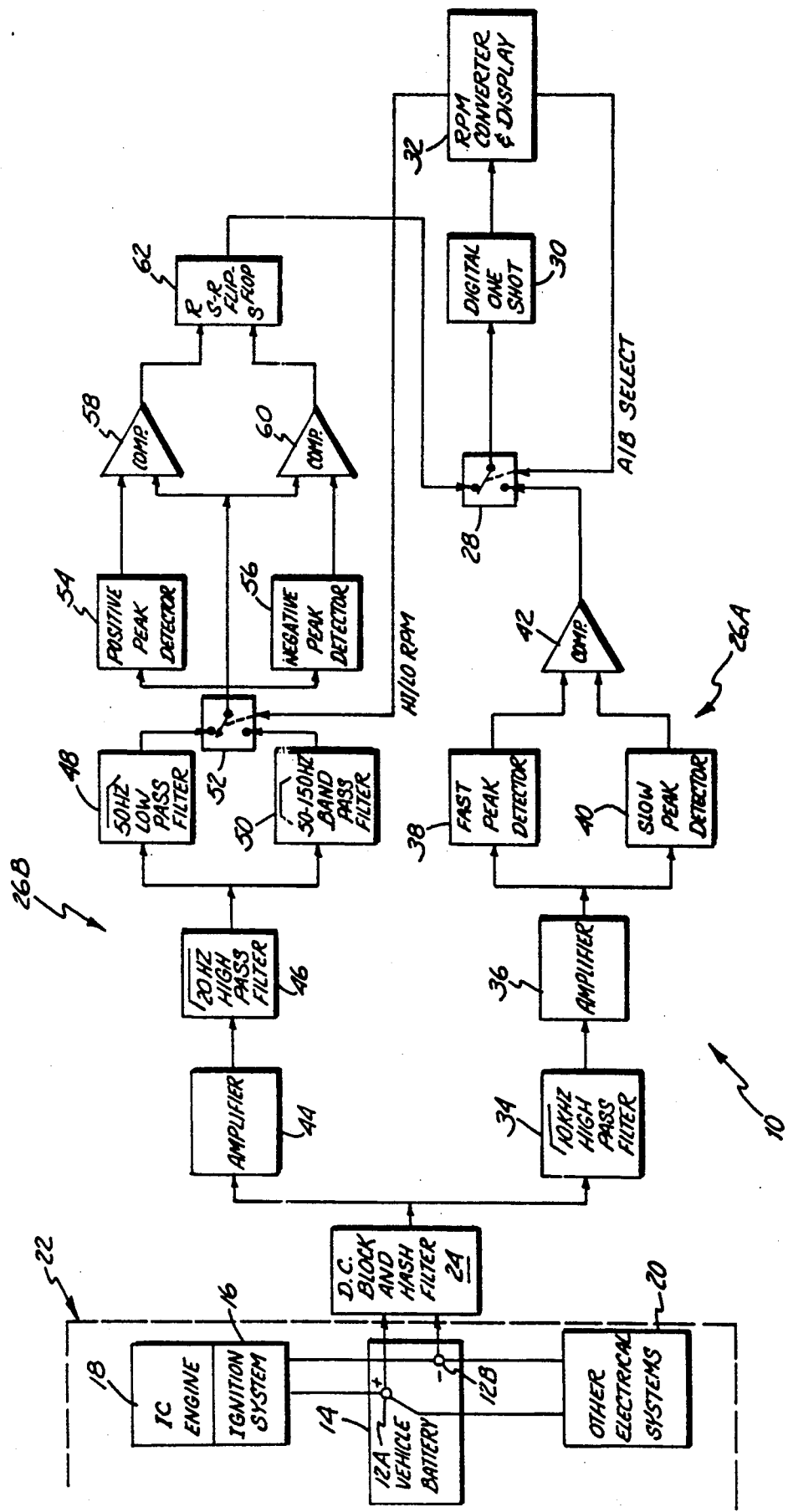

BATTERY TACH

This is a Continuation of application, Ser. No. 07/116,634, filed Nov. 3, 1987 (now abandoned).

BACKGROUND OF THE INVENTION

1. Field of the Invention

The present invention relates to testing equipment for internal combustion engines. In particular, the present invention relates to a tachometer for determining the engine speed (RPM) of an internal combustion engine of a vehicle.

2. Description of the Prior Art

In newer model automobiles, tachometer (RPM) measurement methods have become a problem because it is impossible to connect engine speed transducers to some vehicles, and extremely difficult to connect transducers to others.

The distributorless ignition system (DIS) used in newer model vehicles exhibits these problems. DIS systems have dual firing voltage on each spark plug wire, one for normal firing and the other for what is known as "waste firing". The prior art secondary type transducers pick up both spark plug firings, and the measuring equipment must distinguish these signals in order to develop a proper tachometer reading. The secondary signals sensed by these prior art transducers are not considered to be as reliable as one would like, since spark plug condition and cross firing can create undesirable or unreliable information.

In the prior art, it was customary to use the primary voltage or current as a source of tachometer information. The DIS systems, however, are typically packaged so that they do not have available a connection for sensing primary voltage. For that reason, a special current pickup was developed which would use the primary current when available. There are, however, vehicles in which even current readings have become difficult because the wire is bunched and harnessed in a complete cable.

There is a need for an improved tachometer which is compatible with the modern DIS systems, and which does not require special transducers, and which is compatible with both distributor and distributorless ignition systems.

SUMMARY OF THE INVENTION

The present invention is a tachometer which produces a signal representative of engine speed of an internal combustion engine based upon signals derived from the battery which powers the ignition system of the internal combustion engine. The signal derived from the battery contains many different components produced by the various electrical systems connected to the vehicle battery. In a typical automobile, sources of signals appearing at the vehicle battery terminal include the primary switching current, alternator ripple, spark plug firing noise, injector opening pulses, radiator cooling fan, brush noise, electronic voltage regulator operations, air conditioning system noise, and others. Basically, any system in the vehicle that uses substantial amounts of electrical power will contribute a component or components to the electrical signal which is appearing across the vehicle battery terminals.

With the present invention, the signal from the vehicle battery is filtered and signal processed to separate the wanted signal (which represents operation of the ignition system) from the unwanted signals. The result of the filtering and signal processing( is, in preferred embodiments, a pulse signal which has a frequency related to the speed of the engine.

Depending on the particular vehicle, there are two potential signal components which can be used by the tachometer of the present invention. The first and more common signal component is produced by the primary switching current.

In those vehicles where there is interference between the primary switching current and the regulator operation, a second signal component produced by short bursts of high frequency ringing can also be used to derive an output signal representative of engine RPM.

In preferred embodiments of the present invention, the tachometer includes a first signal processing( path which separates the primary switching current signal component from the battery. A second current path separates the signal component representing short bursts of high frequency ringing which occur when spark plugs fire. Switching means selects the signal path which produces the more reliable signal, and supplies that signal to a pulse generating means (such as a one shot) to produce the output pulse signal.

BRIEF DESCRIPTION OF THE DRAWINGS

The FIGURE shows an electrical block diagram of the battery tachometer of the present invention, as connected to a vehicle battery.

DETAILED DESCRIPTION OF THE PREFERRED EMBODIMENTS

In the FIGURE, tachometer 10 is connected to plus (+) and minus (−) terminals 12A and 12B, respectively, of vehicle battery 14. Also shown in the FIGURE are ignition system 16 of internal combustion engine 18, as well as other electrical systems 20 of vehicle 22. Battery 14 is the conventional DC battery used to provide electrical power for vehicle 22.

Tachometer 10 makes electrical connection to terminals 12A and 12B of battery 14 either directly, or through a convenient connector, such as the cigarette lighter receptacle (not shown) of vehicle 22.

Tachometer 10 includes DC block and hash filter circuit 24 which receives the signals from vehicle battery 14. The output of DC block and hash filter 24 is provided to two separate signal processing paths 26A and 26B. The outputs of signal processing paths 26A and 26B merge at A/B select switch 28. The output selected by switch 28 is provided to digital one shot 30, which produces an output pulse signal which is supplied to RPM converter and display 32. The output pulses from digital one shot 30 are produced at a frequency which is representative of RPM of the vehicle engine. RPM converter and display 32 converts the output pulses from digital one shot 30 to an RPM value, and displays that value either numerically or graphically.

Signal processing circuit path 26A includes high pass filter 34, amplifier 36, fast peak detector 38, slow peak detector 40 and comparator 42. Circuit path 26A separates, from the vehicle battery signal, the component which represents short bursts of high frequency ringing which occurs when a spark plug fires.

Signal processing circuit path 26B includes amplifier 44, high pass filter 46, low pass filter 48, band pass filter 50, HI/LO RPM select switch 52, positive peak detector 54, negative peak detector 56, comparators 58 and 60, and flipflop 62. The purpose of signal processing circuit path 26B is to separate the signal component which represents the current provided to the primary of the ignition system 18. These current pulses have approximately a fifty percent duty cycle, and circuit path 26B filters the signal based on this approximate fifty percent duty cycle.

DC block and hash filter 24 blocks the DC component of the battery signal from reaching either circuit path 26A or 26B. In addition to blocking the DC component (and leaving only the AC components for further signal processing) circuit 24 also provides some hash filtering. The purpose of this filtering is to eliminate some very high frequency signals which cannot be handled by the subsequent processing in signal paths 26A and 26B.

In circuit path 26A, the signals from DC block and hash filter circuit 24 are first filtered by high pass filter 34. In the embodiment shown in the FIGURE, high pass filter 34 is a 10 kHz high pass filter which attenuates signals other than the ignition bursts. These bursts are then amplified by amplifier 36 and Provided to peak detectors 38 and 40. Fast peak detector 38 has an output which rises quickly to the peak value of its input and falls off quickly. Slow peak detector 40, on the other hand, has an output which rises more slowly toward the peak of the input and has a slow fall off. The outputs of peak detectors 38 and 40 are sent to comparator 42. The output of fast peak detector 38 rises faster than the output of slow peak detector 40, and comparator 42 outputs a pulse of a length equal to the time required by slow peak detector 40 to catch up with fast peak detector 38. The long fall-off time of slow peak detector 40 aids in preventing extraneous output pulses from comparator 42.

Signal processing path 26B filters lower frequency signals, since it is looking for the primary switching current pulses. The signal from DC block and hash filter circuit 24 is first amplified by amplifier 44. 20 Hz high pass filter 46 is then used to attenuate signals which are lower than those produced by an idling engine. The filtered signal is then sent to filters 48 and 50. Low pass filter 48 is a 50 Hz low pass filter which together with high pass filter 46 covers the range (about 20 Hz to about 50 Hz) for idling four cycle engines with four, six or eight cylinders.

Band pass filter 50, on the other hand, is a band pass filter which covers the range (50-150 Hz) for revving engines. The outputs of filters 48 and 50 are provided to HI/LO RPM select switch 52. The selection of the filter 48 or 50 used to provide a signal to the subsequent components of signal processing path 26 is based upon feedback from RPM converter and display 32 by way of a high/low RPM signal, which controls the state of switch 52. When the RPM as determined by RPM converter and display 32 exceeds the idle range, switch 52 is changed so that the output of band pass filter 50 is used. As the engine RPM drops back to the idle range, switch 52 is changed back to low pass filter 48. Filters 48 and 50 have overlapping ranges, so that the signal will not be lost between filter ranges. The switching between ranges by RPM converter and display 32 and switch 52 preferably has a hysteresis band to prevent hunting.

The selected signal from switch 52 is provided to positive peak detector 54 and negative peak detector 56. The signal is also fed to comparators 58 and 60 for comparison with the outputs of peak detectors 54 and 56, respectively. The outputs of peak detectors 54 and 56 are a fraction (preferably about one-half) of their respective peak signal points. Comparators 58 and 60 drive the reset and set inputs of flipflop 62, respectively. When the signal from filter 48 or filter 50 exceeds the fractional portion of the average positive signal peak as represented by the output of positive peak detector 54, flipflop 62 is reset. Similarly, when the signal from filter 48 or 50 is at a negative value less than the fractional average negative peaks represented by the output of negative peak detector 56, flipflop 62 is set. This allows for a noise immunity of about one-half of the peak-to-peak signal. Furthermore, this noise immunity value is not a fixed value, but floats along with the signal levels. The output of flipflop 62 is usually a good representation of the firing rate of the engine.

The outputs of signal processing paths 26A and 26B are provided to A/B select switch 28. In one embodiment, switch 28 is controlled by an operator based upon an evaluation of which signal processing path will be more effective. That determination may be made, for example, by the operator's familiarity with the particular vehicle and the type of signals which it produces.

In other embodiments of the present invention, switch 28 is controlled by an A/B select signal which may be produced by other signal processing circuitry within RPM converter and display 32. The selection of state of the A/B select signal, in this embodiment, is based for example on a statistical analysis of the outputs of both signal paths 26A and 26B. In this embodiment, RPM converter and display 32 preferably includes a digital computer such as a microcomputer.

The output of switch 28 is provided to the input of digital one shot 30, which produces an output pulse of a precise time duration to RPM converter and display 32. The frequency of the output pulses of one shot 30 is controlled by the particular input signal from either signal processing path 26A or 26B.

One shot 30 is preferably a digital device, because it provides a precise time duration for causing an interrupt, reading the counter, and resetting it to an initial value for measurement of time until the next pulse. The counter value can be corrected to compensate for the time of the one shot as it can be much more precise than an analog one shot. In other embodiments of the present invention, however, one shot 30 can be an analog rather than a digital device.

In conclusion, the present invention is a tachometer which is reliable and which is easily connected to every vehicle because it merely requires access to the positive and negative terminals of the vehicle battery. This connection can be made either directly to the vehicle battery itself, or to other accessible points such as the cigarette lighter receptacle.

An important advantage of the tachometer of the present invention is its ability to operate with all levels of signals which are available on the battery terminals. In use, tachometer 10 filters the various signals found on the battery terminals 12A and 12B and develops a usable triggering signal for making tachometer (RPM) readings. Tachometer 10 overcomes the problems of making connections to new ignition systems which are devoid of test points for RPM readings. !t also does not rely on secondary wire connections, since in some ignition systems these connections are either covered and not available, or are extremely difficult and of questionable reliability.

Although the tachometer of the present invention can be connected directly to the battery terminals of a vehicle, the signal processing circuitry of tachometer 10 will also accept other sources of the input battery signal (which represents the flow of battery current). For example, Hall effect or inductive type current probes can be used to sense battery current flow at or near the battery. Similarly, a current shunt connected in series with one of the battery terminals or a device for measuring voltage across the battery cable between vehicle ground and the (−) battery terminal can be used to supply the battery signal to battery tach 10 of the present invention.

The filter functions of paths 26A and 26B can be implemented in a number of different ways, and with different technologies. For example, programmable-type filters such as switched-capacitor or charge coupled device filters can be used to provide low pass, band pass and high pass filtering. With programmable-type filters, the need for a separate HI/LO RPM switch 52 may be eliminated, and the low pass and band pass filters 48 and 50 can be embodied in a single variable characteristic filter.

Another advantage of the present invention is its compatability with digital signal processing techniques. Except for DC block and hash filter 24, the remaining circuitry of battery tach 10 shown in the FIGURE can be implemented in either analog or digital circuitry. Digital signal processing techniques offer the further advantage of allowing more adaptive filtering and, in some cases, more complex filtering without a corresponding increase in hardware complexity or cost.

Although the present invention has been described with reference to preferred embodiments, workers skilled in the art will recognize that changes may be made in form and detail without departing from the spirit and scope of the invention.

What is claimed is:

1. A circuit for providing an output signal representative of speed of an internal combustion engine of the type having an electrical ignition system connected to a battery, the circuit comprising:
   means for deriving directly from the battery an input signal representative of time-varying components in battery current, where battery current is the current flow appearing at a battery terminal;
   means for filtering the input signal to produce a filtered signal comprising time-varying components of the input signal having frequencies within a range of frequencies associated with a time-varying signal impressed upon the battery current by operation of the ignition system; and
   means for suppressing components in the filtered signal not associated with ignition system operation to produce the output signal as a function of engine speed.

2. The circuit of claim 1 wherein the means for filtering attenuates time-varying components having a frequency outside a range of frequencies normally associated with primary ignition current pulses to extract a first time-varying component related to engine speed.

3. The circuit of claim 2 wherein the means for filtering comprises:
   first filter means for attenuating signals with frequencies outside a first range associated with primary ignition current pulses produced by the ignition system when the engine is idling; and
   second filter means for attenuating signals with frequencies outside a second range associated with primary ignition current pulses produced by the ignition system when the engine is revving.

4. The circuit of claim 3 wherein the first range is between about 20 Hz and about 50 Hz.

5. The circuit of claim 3 wherein the second range is between about 50 Hz and about 150 Hz.

6. The circuit of claim 2 wherein the means for suppressing comprises:
   first and second peak detector means for producing first and second peak detector signals which are a function of positive and negative peak values of the first time-varying component;
   first and second comparator means for comparing the first time-varying component with the first and second peak detector signals to produce first and second comparator signals, respectively; and
   means for deriving the output signal from the first and second comparator signals.

7. The circuit of claim 1 wherein the means for filtering comprises:
   a filter attenuating time-varying components having frequencies outside a range of frequencies normally associated with spark plug ringing to isolate a second time-varying component related to engine speed.

8. The circuit of claim 7 wherein the range of frequencies is greater than about 10 kHz.

9. The circuit of claim 7 wherein the means for suppressing components in the filtered signal comprises:
   first and second peak detector means for producing first and second signals as a function of peak values of the second time-varying component, the first and second peak detector means exhibiting different time responses to the second time-varying component; and
   comparator means for comparing the first and second signals to produce the output signal.

10. A method of measuring speed of an internal combustion engine of the type having an electrical ignition system connected to a battery, the method comprising:
    deriving directly from the battery an input signal representative of battery current;
    filtering from the input signal representative of battery current, a time-varying signal including components associated with operation of the electrical ignition system, where battery current is current flow appearing at a battery terminal; and
    suppressing noise components of the time-varying signal to produce an output signal as a function of engine speed.

11. The method of claim 10 wherein the step of filtering the time-varying signal comprises:
    blocking a DC component of a signal measured off the battery;
    further filtering AC components of the signal measured off the battery to isolate the time-varying signal.

12. The method of claim 11 wherein the step of further filtering comprises:
    attenuating from the signal measured off the battery, signal components having frequencies outside a range associated with primary ignition current pulses.

13. The method of claim 11 wherein the step of further filtering comprises:
    attenuating from the signal measured off the battery, signal components having frequencies outside a range associated with ignition burst spark plug ringing.

14. A circuit generating a tachometric output signal derived from electrical signals occurring in an electrical system for an internal combustion engine, the electrical system including a battery and an ignition system, the circuit comprising:
   means for deriving directly from the battery an input signal representative of time-varying components in battery current, where battery current is the current flow appearing at a battery terminal;
   filtering means for attenuating components of the input signal having frequencies outside a predetermined range to produce a filtered signal; and
   means for suppressing noise in the filtered signal to produce the tachometric output signal.

15. A electronic tachometer responsive to signals occurring in an electrical system of an internal combustion engine, wherein the electrical system includes a battery and an ignition system which includes at least a first spark plug, the tachometer comprising:
   means for deriving an input signal representative of time-varying components in battery current appearing at a battery terminal;
   a first signal processing path for generating a first tachometric output signal from time-varying components of the input signal associated with primary switching current in the ignition system;
   a second signal processing path for generating a second tachometric output signal from time-varying components of the input signal associated with ignition burst spark plug ringing; and
   means for selecting between the first and second tachometric output signals; and
   means responsive to the selected tachometric output signal for displaying engine rotational speed.

16. The tachometer of claim 15, wherein the first signal path comprises:
   filtering means for attenuating components of the input signal having frequencies outside a plurality of predetermined frequency ranges and producing filtered signals associated with each frequency range;
   means for selecting a filtered signal; and
   a noise suppression stage including,
   means for generating set and reset signals in response to transitions of the selected filtered signal exceeding threshold levels, and
   a bistable device responsive to the set and reset signals for producing the first tachometric output signal.

17. The tachometer of claim 15, wherein the second signal path comprises:
   filtering means for attenuating components of the input signal having frequencies outside a predetermined frequency range and producing a filtered signal; and
   a spark plug ring detect stage operating on the filtered signal to eliminate signal noise, the spark plug ring detect stage including,
   a fast peak detector operating on the filtered signal;
   a slow peak detector operating on the filtered signal; and
   means for comparing outputs of the fast and slow peak detectors for producing the second tachometric output signal.

18. The tachometer of claim 16, wherein the means for generating set and reset signals in the noise suppression stage further include:
   a positive peak detector responsive to the selected filtered signal for generating a positive threshold level signal;
   a negative peak detector responsive to the selected filtered signal for generating a negative threshold level signal;
   a first comparator generating the reset signal in response to the selected filtered signal exceeding the positive threshold level signal; and
   a second comparator generating the set signal in response to the selected filtered signal exceeding the negative threshold level signal.

19. The tachometer of claim 18, wherein the positive peak detector and negative peak detector generate positive and negative threshold level signals which vary as a function of a fraction of a weighted average of recent positive and negative going transitions of the selected filtered signal.

20. The tachometer of claim 19, wherein the filtering means of the first signal processing path include:
   a first filtering circuit path producing a first filtered signal in which the time-varying components of the input signal below 20 Hz and above 50 Hz have been attenuated; and
   a second filtering circuit path producing a second filtered signal in which the time-varying components of the signal below 50 Hz and above 150 Hz have been attenuated.

21. The tachometer of claim 20, and further comprising means for selecting between first and second filtered signals from the first or second filtering circuit path depending upon which range the instant measured frequency of the tachometric output signal lies.

22. The tachometer as set forth in claim 21, wherein the means for selecting between first and second filtered signals exhibit hysteresis to avoid hunting.

23. A electronic tachometer operating on signals occurring in an electrical system for an internal combustion engine, wherein the electrical system includes a battery and an ignition system which includes at least a first spark plug, the tachometer comprising:
   input terminals for connection to positive and negative terminals of the battery for developing an input signal representative of time-varying components in battery current;
   a first signal processing path for generating a first tachometric output signal from components of the input signal associated with primary switching current, the first signal processing path including,
   filtering means for attenuating components of the input signal having frequencies outside predetermined frequency ranges and producing filtered signals associated with each frequency range;
   means for selecting a filtered signal; and
   a noise suppression stage including,
      means for generating set and reset signals in response to transitions of the selected filtered signal exceeding threshold levels, and
      a bistable device responsive to the set and reset signals for producing a first tachometric output signal;
   a second signal processing path for generating a second tachometric output signal from components of the signal associated with ignition burst spark plug ringing, the second signal processing path comprising,
  filtering means for attenuating components of the input signal having frequencies outside a predetermined frequency range and producing a filtered signal; and
  a spark plug ring detect stage operating on the filtered signal, the ring detect stage including,
    a fast peak detector operating on the filtered signal,
    a sloe peak detector operating on the filtered signal, and
    means for comparing outputs of the fast and slow peak detectors for producing the tachometric output signal;
means for selecting between the first and second tachometric output signals; and
means responsive to the selected tachometric output signal for displaying engine rotational speed.

24. A electronic tachometer operating on signals occurring in an electrical system for an internal combustion engine, wherein the electrical system includes a battery and an ignition system, the tachometer comprising:
  means for deriving an input signal representative of time-varying components in battery current;
  a signal processing path for generating a tachometric output signal from components of the input signal associated with primary switching current, the signal processing path including,
    filtering means for attenuating components of the input signal having frequencies outside predetermined frequency ranges and producing filtered signals associated with each frequency range;
    means for selecting between filtered signals; and
    a noise suppression stage including,
      means for generating set and reset signals in response to transitions of the selected filtered signal exceeding threshold levels, and
      a bistable device responsive to the set and reset signals for producing a first tachometric output signal; and
  means for displaying engine rotational speed in response to a tachometric signal.

25. A electronic tachometer operating on signals occurring in an electrical system for an internal combustion engine, wherein the electrical system includes a battery and an ignition system which includes at least a first spark plug, the tachometer comprising:
  means for deriving an input signal representative of time-varying components in battery current;
  a signal processing path for generating a tachometric output signal from components of the input signal associated with spark plug ringing, the signal processing path comprising,
    filtering means for attenuating components of the representative signal having frequencies outside a predetermined frequency range and producing a filtered signal; and
    a spark plug ring detect stage operating on the filtered signal, the ring detect stage including;
      a fast peak detector operating on the filtered signal;
      a slow peak detector operating on the filtered signal; and
      means for comparing outputs of the fast and slow peak detectors for producing the tachometric output signal;
  means for displaying engine rotational speed in response to a tachometric signal.

26. A circuit for providing a tachometric output signal representative of speed of an internal combustion engine of the type having an electrical ignition system connected to a battery, the circuit comprising:
  first connector means for making direct and continuous electrical connection to a positive terminal of the battery;
  a second connector means for making direct and continuous electrical connection to a negative terminal of the battery;
  means connected to the first and second connector means for deriving an electrical signal from the battery which includes DC and AC components;
  means for removing the DC component from the electrical signal;
  means for processing the AC components of the electrical signal to select one of the AC components which is representative of operation of the ignition system and which changes as a function of engine speed; and
  means for producing the tachometric output signal as a function of the AC component selected.

27. A circuit for providing a tachometric output signal representative of speed of an internal combustion engine of the type having an electrical ignition system connected to a battery, the circuit comprising:
  means for making direct and continuous electrical connection to positive and negative terminals of the battery to derive from the battery a multi-component electrical signal appearing across the positive and negative terminals, wherein the electrical signal contains DC and AC components;
  means for separating from the multi-component electrical signal an AC signal component produced by primary switching current of the ignition system; and
  means for producing the tachometric output signal as a function of the AC signal component produced by primary switching current of the ignition system.

28. A circuit for providing a tachometric output signal representative of speed of an internal combustion engine of the type having an electrical ignition system connected to a battery, the circuit comprising:
  means for making direct and continuous electrical connection to positive and negative terminals of the battery to derive from the battery a multi-component electrical signal appearing across the positive and negative terminals, wherein the electrical signal contains DC and AC components;
  means for separating from the multi-component signal an AC signal component produced by spark plug ringing in the ignition system; and
  means for producing the tachometric output signal as a function of the AC signal component produced by spark plug ringing in the ignition system.

29. A circuit for providing an output signal representative of speed of an internal combustion engine of the type having an electrical ignition system connected to a battery, the circuit comprising:
  means for deriving an input signal representative of time-varying components in battery current, where battery current is the current flow appearing at a battery terminal;
  means for filtering the input signal to produce a filtered signal comprising time-varying components of the input signal having frequencies within a range of frequencies associated with a time-varying signal impressed upon the battery current by operation of the ignition system, wherein the means for filtering attenuates time-varying components having a frequency outside a range of frequencies normally associated with primary ignition current pulses to extract a first time-varying component related to engine speed and wherein the means for filtering comprises:

first filter means for attenuating signals with frequencies outside a first range associated with primary ignition current pulses produced by the ignition system when the engine is idling;

second filter means for attenuating signals with frequencies outside a second range associated with primary ignition current pulses produced by the ignition system when the engine is revving;

means for selecting a signal from one of the first and second filter means as a function of engine speed; and means for suppressing components in the filtered signal not associated with ignition system operation to produce the output signal as a function of engine speed.

* * * * *

UNITED STATES PATENT AND TRADEMARK OFFICE
CERTIFICATE OF CORRECTION

PATENT NO. : 5,004,979
DATED : April 2, 1991
INVENTOR(S) : Joseph A. Marino et al.

It is certified that error appears in the above-identified patent and that said Letters Patent is hereby corrected as shown below:

Col. 9, line 11, delete "sloe", insert --slow--.

Signed and Sealed this

Eighth Day of September, 1992

Attest:

DOUGLAS B. COMER

*Attesting Officer*     *Acting Commissioner of Patents and Trademarks*